(12) United States Patent
Gebhard et al.

(10) Patent No.: US 6,428,844 B1
(45) Date of Patent: Aug. 6, 2002

(54) REDUCTION OF MICROFOAM IN A SPRAY-APPLIED WATERBORNE COMPOSITION

(75) Inventors: Matthew Stewart Gebhard, New Britain; Ethan Scott Simon, Ambler, both of PA (US)

(73) Assignee: Rohm and Haas Company, Philadelphia, PA (US)

( * ) Notice: Subject to any disclaimer, the term of this patent is extended or adjusted under 35 U.S.C. 154(b) by 18 days.

(21) Appl. No.: 08/153,239

(22) Filed: Nov. 15, 1993

Related U.S. Application Data

(63) Continuation-in-part of application No. 08/012,674, filed on Feb. 3, 1993, now abandoned.

(51) Int. Cl.[7] .................................................. B05D 3/02
(52) U.S. Cl. ........................ 427/189; 427/195; 427/421; 521/78
(58) Field of Search ................................ 427/421, 189, 427/195; 521/78

(56) References Cited

U.S. PATENT DOCUMENTS

| 3,661,605 A | 5/1972 | Rubin et al. |
|---|---|---|
| 3,985,703 A | 10/1976 | Ferry et al. |
| 4,708,967 A | 11/1987 | Ferentchak et al. |
| 4,842,900 A | 6/1989 | Miyamoto |
| 4,869,878 A | 9/1989 | Pütz |
| 4,923,720 A | 5/1990 | Lee et al. |
| 5,106,650 A | 4/1992 | Hoy et al. |
| 5,108,799 A | 4/1992 | Hoy et al. |
| 5,164,177 A | 11/1992 | Bhatt et al. |

FOREIGN PATENT DOCUMENTS

| EP | 37686 | 10/1981 |
|---|---|---|
| EP | 240356 | 10/1987 |
| EP | 321607 | 6/1989 |
| EP | 0388915 | * 9/1990 |
| EP | 0388923 | 9/1990 |
| GB | 2020308 | 11/1979 |
| JP | 6085929 | 5/1985 |
| JP | 252702 | 4/1986 |

OTHER PUBLICATIONS

J.G.P. Verhey, Neth. Milk Dairy J., 26, 203–224 (1972).

* cited by examiner

*Primary Examiner*—John M. Cooney, Jr.

(57) ABSTRACT

A method for reducing the amount of microfoam in a spray-applied waterborne polymeric composition is provided, wherein a gas, such as, for example, carbon dioxide, having a solubility factor greater than one is used in spraying the waterborne composition. Articles so coated are also provided. And, a method for increasing the density of a spray-dried waterborne polymeric composition is provided, wherein a gas, such as, for example, carbon dioxide, having a solubility factor greater than one is used in spray-drying the waterborne composition.

16 Claims, No Drawings

REDUCTION OF MICROFOAM IN A SPRAY-APPLIED WATERBORNE COMPOSITION

This application is a Continuation-in-part of U.S. Ser. No. 08/012,674, abn filed Feb. 3, 1993, and entitled "REDUCTION OF MICROFOAM IN A SPRAY-APPLIED WATERBORNE COMPOSITION"

FIELD OF THE INVENTION

This invention relates to a method for reducing the amount of microfoam in a spray-applied waterborne polymeric composition. And, a method for increasing the density of a spray-dried waterborne polymeric composition is provided.

BACKGROUND OF THE INVENTION

Waterborne polymeric compositions such as clear or pigmented coatings are frequently applied to substrates by spraying techniques. Some of the common spraying techniques used are, for example, air spray, airless spray, air-assisted airless spray, disc and bell spray, and high volume low pressure spray. In air spray compressed air is critical to atomize the waterborne polymeric composition and to assist in conveying the droplets to the substrate. In airless, disc, and bell spray techniques the waterborne polymeric composition is atomized by mechanical means and the droplets are suspended in air on formation. Air-assisted airless spray is a hybrid of the two spray methods described above wherein air is used to convey the droplets which are formed mechanically; and high volume low pressure spray is another commonly recognized variant of air spray. In each case air is involved in the atomizing and/or conveying aspect of the spraying methods.

Waterborne compositions containing water-soluble or water-insoluble polymers frequently contain microfoam when they are applied to substrates by various spraying techniques using air in the spraying process. Microfoam remaining in a dried film formed from the spray-applied aqueous composition may detract from the appearance of the film, particularly from the appearance of a clear, or unpigmented, film.

And, in another embodiment waterborne compositions containing water-soluble or water-insoluble polymers may be spray dried to form dry powders. In certain uses of such dry powders it is advantageous that the powder have as high a density as possible.

DESCRIPTION OF THE PRIOR ART

U.S. Pat. No. 4,842,900 discloses a method and apparatus for coating a liquid coating composition to a moving web in which air entrained on the web is replaced by a gas having a higher solubility than air in the liquid coating composition such as, for example, carbon dioxide.

U.S. Pat. No. 3,661,605 discloses an aqueous aerosol composition composed of a homogenized dispersion of lecithin in water and contains a propellant, eg., carbon dioxide or nitrous oxide, for pressurizing the composition in an amount sufficient to produce a release coating of lecithin on a surface when the composition is sprayed. Further disclosed is spraying an aqueous dispersion of lecithin by other means such as squeezing from a flexible bottle.

U.S. Pat. No. 4,869,878 discloses a device for the creation of an oxygen-free working atmosphere such as a device for the production of propellant and buffer gasses such as combustion waste gas for a spray gun with which molten metal or ceramic is applied to a workpiece.

U.S. Pat. No. 4,923,720 discloses a liquid coatings application process and apparatus in which supercritical fluids, such as supercritical carbon dioxide fluid, are used to reduce to application consistency viscous coatings compositions to allow for their application as liquid sprays.

Japanese Patent Application No. 60/85929 discloses a spraying composition containing a water-soluble resin, including vinyl acetate resin, and an Oxygen-blocking agent such as silicone oil. The propellant gas used in spraying is fluorocarbon or carbon dioxide.

United Kingdom Patent Application No. 2,020,308 discloses a propellant for aerosol spray cans, particularly lacquer spray cans, which is based on the use of carbon dioxide/ propane/ butane mixture.

None of the references discloses a method for reducing the amount of microfoam in a spray-applied waterborne composition or increasing the density of a spray-dried waterborne composition.

SUMMARY OF THE INVENTION

A method for reducing the amount of microfoam in a spray-applied waterborne polymeric composition is provided, wherein a gas having a solubility factor greater than about one is used in spraying the waterborne composition. And, a method for increasing the density of a spray-dried waterborne polymeric composition is provided, wherein a gas having a solubility factor greater than about one is used in spraying the waterborne composition.

DETAILED DESCRIPTION OF THE INVENTION

This invention is directed to a method for reducing the amount of microfoam in a spray-applied waterborne polymeric composition by spraying the waterborne composition using a gas having a solubility factor greater than about one.

A "waterborne polymeric composition" herein is defined as a composition containing a soluble polymer dissolved in or an insoluble polymer dispersed in a medium which is predominantly composed of water, or mixtures thereof. The waterborne polymeric composition may contain a solution of a polymer in water or in an aqueous medium, which aqueous medium may be, for example, a mixture of water and at least one water-miscible solvent such as, for example, isopropanol, ethylene glycol butyl ether, and propylene glycol propyl ether; the waterborne polymeric composition may contain an alkali-soluble polymer dissolved in an alkaline aqueous medium; or the waterborne polymeric composition may contain a dispersion of an insoluble polymer in an aqueous medium such as, for example, an emulsion-polymerized polymer.

The polymer in the waterborne polymeric composition may be prepared by the addition polymerization of at least one ethylenically unsaturated monomer such as, for example, esters of (meth)acrylic acid, vinyl esters, styrene, and butadiene. Polar monomers such as (meth)acrylic acid, itaconic acid, acrylonitrile, dimethylaminoethyl (meth)acrylate, and hydroxyethyl (meth)acrylate may also be incorporated in the polymer. Low levels of multi-ethylenically unsaturated monomers may be incorporated in the polymer. Chain transfer agents such as, for example, mercaptans may be used in order to moderate the molecular weight of the polymer. When the polymer is in the form of an emulsion-polymerized polymer, the particles may be from about 40 nanometers to about 4000 nanometers in diameter.

The solids content of the waterborne polymeric composition may be from about 20% to about 70% by weight. The viscosity of the waterborne polymeric composition may be from about 50 centipoises to about 10,000 centipoises, as measured using a Brookfield viscometer (Model LVT using spindle #3 at 12 rpm); the viscosities appropriate for different spraying methods vary considerably.

The waterborne polymeric composition may contain, in addition to the polymer, conventional components such as, for example, emulsifiers, pigments, fillers, dispersants, coalescing agents, anti-migration aids, curing agents, thickeners, humectants, wetting agents, biocides, plasticizers, antifoaming agents, colorants, waxes, and antioxidants.

A spray-applied waterborne polymeric composition is a composition which has been applied to a substrate such as, for example, metal, wood, and plastic, using a spraying method. Preferred is a composition which has been applied to a wood substrate such as, for example, wood, sealed wood, particle board treated with a UV-cured filler, painted wood, and previously coated wood; or to an automotive substrate such as, for example, plastic, reinforced plastic (such as RIM substrate), metal, treated metal, metal coated with an electodeposited primer, and previously painted metal; by a spraying method such as, for example, air-assisted spray, airless spray, bell or disc spraying, high volume low pressure spray, and air-assisted electrostatic spray. In spraying methods the waterborne polymeric composition is atomized, or formed into small droplets, which are conveyed to the substrate where the droplets form into a substantially continuous structure such as, for example, a film. In such spray-applied methods the atomized droplets of the waterborne polymeric composition are formed in contact with and/or admixed with a gas-conventionally, air. The gas, under pressure, may be required to atomize the coating such as, for example, in conventional air spray applications; the gas may flow towards the substrate and provide for at least some of the conveying of the atomized composition such as, for example, in air-assisted airless spray application; or the gas may be the medium through which the atomized composition, atomized by mechanical action in the presence of the gas such as, for example, in airless spray, disc, and bell applications, with or without electrostatic assistance, moves to the substrate. Occlusions of gas, "microfoam", typically are found in the waterborne polymeric composition after its application to the substrate when using air as the gas in the process. The microfoam is undesirable; microfoam may cause haze or opacity in clear or substantially unpigmented coatings or films; and microfoam may lower the clarity, depth, gloss, or "distinctness of image" of clear or pigmented coatings or films. In the method of this invention microfoam which has formed within the applied waterborne polymeric composition is reduced in amount by using a gas having a solubility factor greater than about one in place of air. "Using a gas having a solubility factor greater than one" as used herein means that at least one gas having a solubility factor, as defined herein, greater than about one is used in the spraying process in place of the air commonly used. The gas having a solubility factor greater than about one may be used under pressure where such is required by the spraying method selected; or the gas having a solubility factor greater than about one may be used at atmospheric pressure in the area where the atomized droplets are formed and admixed with gas. Preferred is using a gas with a solubility factor greater than about 35. Most preferred is using carbon dioxide gas.

"Microfoam" herein is defined as substantially spherical gas-filled occlusions which are typically 10–20 micrometers in radius. The microfoam occlusions lack sufficient buoyancy to escape from the waterborne polymeric composition before they become substantially immobilized in the applied composition. The "amount of microfoam" as used herein is determined by counting the number of bubbles in a selected area of the applied waterborne composition, using an optical microscope under 70X magnification.

The method of this invention includes spraying the waterborne polymeric composition using a gas having a solubility factor greater than about one. The "solubility factor" of a gas as used herein is defined as:

$$\text{solubility factor of a gas} = \frac{\text{solubility of the gas in water}}{\text{solubility of nitrogen in water}}$$

wherein solubility is measured at 25 C. at 1 atmosphere gas pressure.

Some solubility factors are presented below:

| Gas | Solubility in water | Solubility Factor |
| --- | --- | --- |
| Nitrogen | 0.65 millimoles per liter(1) | — |
| Carbon dioxide | 34 millimoles per liter(1) | 52.3 |
| Nitrous oxide | 24 millimoles per liter(2) | 36.9 |

1. Clever, H. L.; Battino, R.; in "Solutions and Solubilities" edited by Dack M. R. J, Wiley-Interscience, New York, 1975
2. Battino, R.; Wilcock, R. J. Chem Rev., 77, 219, (1979).

And, in another embodiment, a method for increasing the density of a spray-dried waterborne polymeric composition is provided, wherein a gas having a solubility factor greater than about one is used in spray-drying the waterborne composition. Carbon dioxide is the preferred gas. In some uses a spray-dry prepared powder of increased density is desired. For example, in the ceramic industry the operation of dry pressing requires dry granules of ceramic powder mixed with dispersants and binders. Denser powder granules have improved flow properties and fill dry press molds better than less dense powders. Denser powder granules are formed when aqueous slips containing pigment, dispersant, and polymeric binder are spray-dried using carbon dioxide rather than nitrogen as the atomizing and carrier gas.

The following examples are intended to illustrate the method for reducing the amount of microfoam in a spray-applied waterborne polymeric composition; and to illustrate a method for increasing the density of a spray-dried waterborne polymeric composition. They are not intended to limit the invention as other applications of the invention will be obvious to those of ordinary skill in the art.

EXAMPLE 1

Reduction of Microfoam when Using a Gas-assisted Suction-feed Spray Gun 1000 g of a styrene/acrylic emulsion polymer (Rhoplex™ CL-105) at 36% solids by weight was adjusted to pH=8.5 with 14% $NH_4OH$ and a solution of 46.8 g ethylene glycol monobutyl ether, 54 g isopropyl alcohol, 7.2 g. ethylene glycol 2-ethyl hexyl ether, and 276.6 g water was added with stirring using a bench top stirrer to provide a sealer composition. A maple wood panel sanded with 220 grit sandpaper was sprayed with this sealer composition to a wet film thickness of 4 mils; the coating was air-dried for 45 minutes and re-sanded with 220 grit sandpaper to provide a sealed maple panel. 300 g of a styrene/acrylic latex (Rhoplex™

CL-104) at 38.5% solids by weight was adjusted to pH=7.5 with 14% $NH_4OH$ and a solution of 17.3 g ethylene glycol monobutylether, 11.5 g diethylene glycol monobutylether, and 32.1 g water was added with stirring using a benchtop stirrer. This topcoat composition was sprayed using a conventional suction-feed spray gun (DeVilbiss MBC) with an EX tip and a #30 air cap, with a gas pressure of 50 psi. Three top coats were applied to each sealed maple panel described herein-above with 30 minutes of dry time between each coat. One of the panels was sprayed using compressed air while the other panel was sprayed using compressed $CO_2$. The panels were sprayed under the same temperature and humidity conditions (85° F./40% RH) and were dried under these conditions. This was accomplished by connecting a cylinder of $CO_2$ directly to the spray gun in the same manner as the compressed air.

The dried panels were evaluated for distinctness of image (DOI), gloss (20°/60°/85°), visual microfoam, and amount of microfoam. Gloss readings were made with a Byk Labotron gloss unit. Distinctness of image readings were made using a Gardner DOI meter (Model # GB11-8GM) which uses a Landolt Ring film to quantify the DOI. DOI readings were made by placing the coated piece under the DOI meter and visually determining the smallest rings which could clearly be distinguished. DOI was rated from 100 (best) to 0 (worst). The panel was approximately 9 mm below the light source. The amount of microfoam was determined by counting the number of bubbles in a 1 sq. mm. area of the film using an optical microscope at 70×magnification and reported as the number of bubbles in a 1 sq. mm. area.

The results are presented in Table 1.1 below.

TABLE 1.1

Gas-assisted spray-applied clear coating evaluation

| Gas | DOI | Gloss 85°/60°/20° | Microfoam Amount |
|---|---|---|---|
| Air | 0 | 24/22/4 | >200 |
| $CO_2$ | 40 | 81/83/50 | 5 |

Using carbon dioxide with a solubility factor greater than about one in the method of this invention caused a substantial reduction in the amount of microfoam in the dried coating and an improvement in other appearance properties of the coating.

EXAMPLE 2

Reduction of Microfoam when Using a Gas-assisted Suction-feed Spray Gun

A sealed maple wood substrate and topcoat composition were prepared as in Example 1. The topcoat composition was sprayed using a conventional suction-feed spray gun (DeVilbiss MBC) with an EX tip and a #30 air cap, with a gas pressure of 50 psi. Three top coats were applied to each sealed maple panel with 30 minutes of dry time between each coat. The panels were sprayed under the same temperature and humidity conditions (85° F./40% RH) and were dried under these conditions. One of the panels was sprayed using compressed air while the other panel was sprayed using compressed $N_2O$. This was accomplished by connecting a cylinder of $N_2O$ directly to the spray gun in the same manner as the compressed air.

The dried panels were evaluated for distinctness of image (DOI), gloss (20°/60°/85°), and amount of microfoam using the methods of Example 1. The results are presented in Table 2.1 below.

TABLE 2.1

Gas-assisted spray-applied clear coatings

| Gas | DOI | Gloss 85°/60°/20° | Microfoam Amount |
|---|---|---|---|
| Air | 0 | 40/30/6 | >200 |
| $N_2O$ | 50 | 93/86/61 | 30 |

Using nitrous oxide with a solubility factor greater than about one in the method of this invention caused a substantial reduction of microfoam in the dried coating and an improvement in other appearance properties of the coating.

EXAMPLE 3

Reduction of Microfoam when Using an "Airless Spray" Spray Gun

A waterborne polymeric composition was prepared. The following ingredients were dispersed using a Cowles disperser at high speed.

165 g Titanium dioxide (Tioxide TR-92)

31.2 g Diethylene glycol monomethyl ether 6.95 g Anionic pigment dispersant(Tamol 681; 35% solids)

0.8 g $NH_4OH$ (28%)

1.5 g Anionic surfactant (Triton CF-10)

0.5 g Defoamer (Drew L-493)

15.7 g water

The following ingredients were added in the order given, with stirring.

519.9 g Styrene/acrylic emulsion polymer (Experimental Emulsion E-3054PMN at 50.6% solids)

181.2 g water 4 g Sodium Nitrite (15% aqueous)

32.9 g Texanol coalescent 7.6 g Urethane rheology modifier (QR-708; 10% aqueous)

5.2 g Linoleic Acid (tech. grade)

5.2 g Cobalt drier (Aquacat; 5% Co)

2.6 g Manganese drier (Magnacat; 5%Mn)

The pH was then adjusted to 9.5 with 14% $NH_4OH$ and this composition was applied to an Alodine aluminum panel by "airless spraying".

A 30:1 Graco President pump and a Binks Airless 1 gun was used. The fluid pressure was 2300 psi and the tip orifice was 0.019" which gave a 10" fan. "Airless spray" relies on ejection of the coating from a small orifice at high pressure, typically at 1500–3000 psi, to atomize the composition; in this Example air or, alternatively, $CO_2$ gas was passed over the tip of the airless spray gun in order to affect the composition of the gas in the foam bubbles which would be present initially in the applied composition; it is believed that the foam was the result of the surrounding gas being entrained in the applied composition. The gas pressure was approximately 50 psi. One coat approximately 12 wet mils in thickness was applied and the coated aluminum panel was dried at 75° F. and 25% RH. The dried panels were evaluated for distinctness of image (DOI), gloss (20°/60°/85°), and amount of microfoam. Test methods used were the same as in Example 1. Results are presented in Table 3.1.

TABLE 3.1

Evaluation of the effect of surrounding gas composition using airless spray spray-application

| Gas | DOI | Gloss 85°/60°/20° | Amount of Microfoam |
|---|---|---|---|
| Air | 0 | 77/75/36 | 80 |
| $CO_2$ | 40 | 90/86/55 | 20 |

Using carbon dioxide with a solubility factor greater than about one in the method of this invention caused a substantial reduction of microfoam in the dried coating and an improvement in other appearance properties of the coating.

EXAMPLE 4

Reduction of Microfoam when Using a High Volume Low Pressure (HVLP) Spray Gun

A sealed maple wood panel was prepared as in Example 1 for use as a substrate.

300 g of a styrene/acrylic latex (Rhoplex™ CL-104) at 38.5% solids by weight was adjusted to pH=7.5 with 14% $NH_4OH$ and a solution of 23.1 g ethylene glycol monobutylether, 5.8 g diethylene glycol monobutylether, and 32.1 g water was added with stirring using a benchtop stirrer. This waterborne polymeric composition was sprayed using a HVLP spray gun (Binks Mach 1) with a #97 nozzle, a #95P aricap, and a gas pressure of 90 psi. Three coats were applied to each sealed maple panel with 30 minutes of dry time between each coat. The panels were sprayed under the same temperature and humidity conditions (75° C./25% RH) and were dried under these conditions. One of the panels was sprayed using compressed air while the other panel was sprayed using compressed $CO_2$. This was accomplished by connecting a cylinder of $CO_2$ directly to the spray gun in the same manner as the compressed air.

The dried panels were evaluated for distinctness of image (DOI), gloss (20°/60°/85°), and amount of microfoam. Test methods were those of Example 1.

The results are presented in Table 4.1 below.

TABLE 4.1

Gas-assisted HVLP spray-applied clear coatings

| Gas | DOI | Gloss 85°/60°/20° | Microfoam Amount |
|---|---|---|---|
| Air | 0 | 39/31/6 | 160 |
| $CO_2$ | 50 | 84/80/54 | 12 |

Using carbon dioxide with a solubility factor greater than about one in the method of this invention caused a substantial reduction of microfoam in the dried coating and an improvement in other appearance properties of the coating.

EXAMPLE 5

Reduction of Microfoam when Using an Air-assisted Airless Spray Gun

A sealed maple wood panel was prepared as in Example 1 for use as a substrate.

300 g of a styrene/acrylic latex (Rhoplex™ CL-104) at 38.5% solids by weight was adjusted to pH=7.5 with 14% $NH_4OH$ and a solution of 23.1 g ethylene glycol monobutylether, 5.8 g diethylene glycol monobutylether, and 32.1 g water was added with stirring using a benchtop stirrer. This waterborne polymeric composition was sprayed using an air-assisted airless spray gun (Kremlin MR) with a #09.133 tip and a #BX3a air cap. A #807 pump was used to pressurize the liquid. The liquid pressure was 400 psi and the gas pressure was 45 psi. Three coats were applied to each sealed maple panel with 30 minutes of dry time between each coat. The panels were sprayed under the same temperature and humidity conditions (75° F./25% RH) and were dried under these conditions. One of the panels was sprayed using compressed air while the other panel was sprayed using compressed $CO_2$. This was accomplished by connecting a cylinder of $CO_2$ directly to the spray gun in the same manner as the compressed air.

The dried panels were evaluated for distinctness of image (DOI), gloss (20°/60°/85°), and amount of microfoam. Test methods were those of Example 1.

The results are presented in Table 5.1 below.

TABLE 5.1

Gas-assisted airless spray-applied clear coatings

| Gas | DOI | Gloss 85°/60°/20° | Microfoam Amount |
|---|---|---|---|
| Air | 0 | 28/25/5 | 70 |
| $CO_2$ | 10 | 47/42/11 | 30 |

Using carbon dioxide with a solubility factor greater than about one in the method of this invention caused a reduction of microfoam in the dried coating and an improvement in other appearance properties of the coating.

EXAMPLE 6

Increased Density of Spray-dried Powder

A ceramic slip was prepared by ball milling 240.0 g. of alumina powder (Alcoa A-16SG), 150 ml. distilled water, and 2.88 g. 25% aqueous solution of dispersant (ACUMER 9500) at 85 rpm for 40 minutes in a "OO"-jar with 1160 g. of grinding media. Then 15.32 g. of a 47% aqueous acrylic emulsion polymer (RHOPLEX B-60A) was added and the mixture was ball milled for an additional 20 minutes. The slip was divided into two equal portions one of which was spray-dried using carbon dioxide, the other using nitrogen.

The slips were spray-dried in a Buchi Model 901 Mini Spray Drier, using an inlet temperature of 130 C., outlet temperature of 60 C., and a nozzle pressure of 60 psi. The spray drying was repeated three times using three independently prepared slips. Visual examination indicated that the powders formed using carbon dioxide were less agglomerated than those formed using nitrogen.

To measure the packed density of the particles, a 5.00 g. portion of the powder was placed in a 10 ml., 1.27 cm.-diameter graduated cylinder. The cylinder was capped and then the cylinder was tapped 2,000 times using a Stampvolumeter Stav 2003 (J. Engelsmann A.-G., Ludwigshafen, Germany). The volume was then recorded and the tap density was calculated. The average tap density using carbon dioxide (mean of 9 density measurements) was 1.3+/−0.2 g./cc.; the average tap density using nitrogen (mean of 10 density measurements) was 0.91+/−0.2 g./cc.

Using a gas with a with a solubility factor greater than about one in the method of this invention caused an increased density in a spray-dried powder.

What is claimed is:

1. A method for reducing the amount of microfoam in a spray-applied waterborne polymeric composition comprising forming a waterborne polymeric composition, atomizing said composition, and spraying said atomized composition, wherein said atomizing and said spraying is achieved by means of a gas having a solubility factor greater than about one, wherein said polymeric composition comprises a dispersed water-insoluble polymer.

2. The method of claim 1 wherein said solubility factor is greater than about 35.

3. The method of claim 1 wherein said gas is selected from the group consisting of nitrous oxide and carbon dioxide.

4. The method of claim 1 wherein said gas is carbon dioxide.

5. The method of claim 1 wherein said spraying is gas-assisted spraying, airless spraying, gas-assisted airless spraying, or gas-assisted high volume, low pressure spraying.

6. A substrate bearing a spray-applied waterborne polymeric composition with reduced amount of microfoam prepared according to the method of claim 1.

7. The substrate of claim 6 wherein said substrate is a wood substrate.

8. The substrate of claim 6 wherein said substrate is an automotive substrate.

9. A method for increasing the density in a spray-applied waterborne polymeric composition comprising forming a waterborne polymeric composition, atomizing said composition, and spraying said atomized composition, wherein said atomizing and said spraying is achieved by means of a gas having a solubility factor greater than about one, wherein said polymeric composition comprises a dispersed water-insoluble polymer.

10. The method of claim 9 wherein said solubility factor is greater than about 35.

11. The method of claim 9 wherein said gas is selected from the group consisting of nitrous oxide and carbon dioxide.

12. The method of claim 9 wherein said gas is carbon dioxide.

13. A method for reducing the amount of microfoam in a spray-applied waterborne polymeric composition comprising, forming a waterborne polymeric composition, atomizing said composition, and spraying said atomized composition, wherein said atomizing and said spraying are achieved by a process other than by means of a compressed gas, wherein said atomizing and said spraying occur in the presence of a gas having a solubility factor greater than about one, wherein said polymeric composition comprises a dispersed water-insoluble polymer.

14. A method for reducing the amount of microfoam in a spray-applied waterborne polymeric composition comprising, forming a waterborne polymeric composition, atomizing said composition, and spraying said atomized composition, wherein said atomizing and said spraying are primarily achieved by a process other than by means of a compressed gas, wherein the remainder of said atomizing and said spraying are achieved by means of a gas having a solubility factor greater than about one, wherein said polymeric composition comprises a dispersed water-insoluble polymer.

15. A method for increasing the density in a spray-applied waterborne polymeric composition comprising, forming a waterborne polymeric composition, atomizing said composition, and spraying said atomized composition, wherein said atomizing and said spraying are achieved by a process other than by means of a compressed gas, wherein said atomizing and said spraying occur in the presence of a gas having a solubility factor greater than about one, wherein said polymeric composition comprises a dispersed water-insoluble polymer.

16. A method for increasing the density in a spray-applied waterborne polymeric composition comprising, forming a waterborne polymeric composition, atomizing said compositions and spraying said atonized composition, wherein said atomizing and said spraying are primarily achieved by a process other than by means of a compressed gas, wherein the remainder of said atomizing and said spraying are achieved by means of a gas having a solubility factor greater than about one, wherein said polymeric composition comprises a dispersed water-insoluble polymer.

* * * * *